(12) United States Patent
Chiu et al.

(10) Patent No.: US 6,961,870 B2
(45) Date of Patent: Nov. 1, 2005

(54) DATA EXCHANGE UPDATE AND BACK-UP SYSTEM AND METHOD BETWEEN DUAL OPERATING SYSTEMS OF A COMPUTER

(75) Inventors: Chaucer Chiu, Taipei (TW); Frances Dai, Shanghai (CN)

(73) Assignee: Inventec Corporation, Taipei (TW)

( * ) Notice: Subject to any disclaimer, the term of this patent is extended or adjusted under 35 U.S.C. 154(b) by 674 days.

(21) Appl. No.: 10/095,710

(22) Filed: Mar. 13, 2002

(65) Prior Publication Data

US 2003/0177276 A1 Sep. 18, 2003

(51) Int. Cl.[7] .............................................. G06F 11/00
(52) U.S. Cl. ...................................... 714/11; 714/13
(58) Field of Search ........ 714/11–13, 4; 709/213–215, 709/319, 224; 711/162

(56) References Cited

U.S. PATENT DOCUMENTS 5,488,716 A * 1/1996 Schneider et al. ............ 714/10
5,857,208 A * 1/1999 Ofek ........................... 707/204
6,304,980 B1 * 10/2001 Beardsley et al. ............. 714/6
6,510,500 B2 * 1/2003 Sarkar ......................... 711/162
6,662,281 B2 * 12/2003 Ballard et al. ............... 711/162
6,754,855 B1 * 6/2004 Denninghoff et al. ......... 714/48

* cited by examiner

Primary Examiner—Dieu-Minh Le
(74) Attorney, Agent, or Firm—Jacobson Holman PLLC

(57) ABSTRACT

An updating and back-up system and method of exchanging data in two co-existing OSs (operating system) of a computer, which makes connections between different personal information management systems of a computer execution platform. It utilizes a batch or a real-time monitoring method to process data exchange, data updating and date back-up. The disclosed system consists of: a first auto-update and real-time monitor module, a second auto-update and real-time monitor module, a backup data interim storage module, and a system connecting and exchange module. The disclosed method consists of the following steps: starting up the system, reading configuration set-up, establishing connecting channels, processing a batch update of temporarily stored backup data, processing real-time monitor updating of changed/modified data, completing the operation of temporarily storing backup data, and disconnecting the system.

8 Claims, 5 Drawing Sheets

DATA EXCHANGE UPDATE AND BACK-UP SYSTEM AND METHOD BETWEEN DUAL OPERATING SYSTEMS OF A COMPUTER

BACKGROUND OF THE INVENTION

1. Field of the Invention

The invention relates to an update and back-up system and its method of exchanging data between two co-existing OSs (operating systems) of a computer. It is a system and method operating between two personal information management systems of a computer platform for simultaneously updating and duplicating data through data exchange.

2. Related Art

With increasing efficiency and powerful functions applied to computers, more and more people are able to install different OSs in one single computer platform for meeting the complicated application requirements of their working environments. Because of this, software with similar functions has to be installed in both OSs, since there are tiny differences of execution requirements between different OSs. This enables a user to operate related software with required functions on different OSs. The related software has to be application software that is indispensable and with basic functions. The most commonly used system software is the software with Personal Information Management (PIM) functions.

There have been long-standing problems of data exchange, data updating and data back-up in computers. At present, it is even a great trouble for a user to operate different systems in one computer. Generally, in order to achieve the objects of data exchange, data updating, and data back-up in-between different OSs in one computer, users prefer the simplest way through the auxiliary mediums of various storage media (such as CDs, floppy discs, etc.) to complete the processes. However, it is a tiresome and long process to export data by means of temporarily storing data into a so-called intermediary, and then import data into another OS. It is inefficient and inconvenient for a user to process data compiling and exchanging where there is a problem of data format incompatibility at both storage ends. Moreover, it is necessary for a user to be involved all the time in completing synchronized data operations. Everyone knows that the importance of data is its timeliness. Therefore, it would be of little value if data and information cannot be synchronized. This kind of outdated operation is unable to put information tools to good use.

Thus, it is necessary to establish a system and method that automatically provides the functions of data exchange, data updating, and data back-up under the circumstances of executions in-between different OSs in one single computer without a user's involvement.

SUMMARY OF THE INVENTION

In view of the foregoing, the disclosed invention aims at resolving the above-mentioned problem by proposing an update and back-up system and its method of exchanging data in two co-existing OSs of a computer. The objective of the invention is to achieve data synchronization by means of connecting personal information management systems under the co-existing OSs to process data exchange, date updating, and data back-up when the OSs are switching from one to the other.

To achieve the aforementioned objective, the proposed update and back-up system and its method of exchanging data in two co-existing OSs of a computer includes at least: a first auto-update and real-time monitor module, a second auto-update and real-time monitor module, a backup data temporary storage module, and a system connection and exchange module.

In addition, the proposed update and back-up system and its method of exchanging data in two co-existing OSs of a computer consists of the following steps: starting reading configuration setup and establishing connection channels, processing batch operations of temporarily stored backup data updating, processing real-time monitoring and updating of modified data, completing execution of temporarily stored backup data, and disconnecting the system.

The detailed contents and technologies of the invention will be elaborated by means of embodiments and drawings depicted in the following.

DETAILED DESCRIPTION OF THE INVENTION

Figure 1:
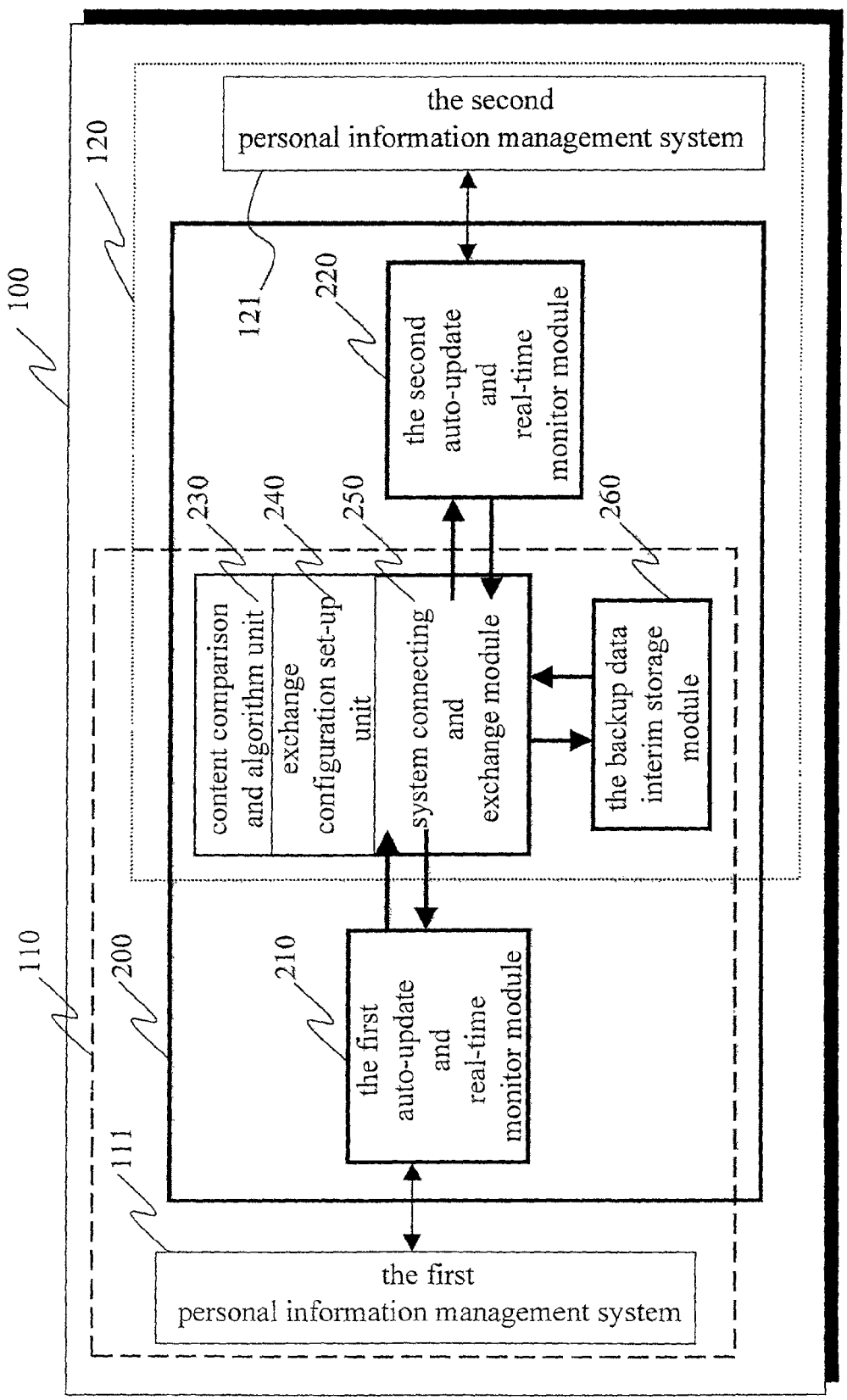
FIG. 1 shows a main structure of the functional modules of the disclosed system and method.

The disclosed invention proposes an updating and back-up system and method of exchanging data in two co-existing OSs of a computer. It is particularly applied to connect different personal information management systems (e.g. the first personal information management system 111, the second personal information management system 121 . . . ) in different OSs (e.g. the first operating system 110, the second operating system 120 . . . ) on a computer platform 100 of the same computer for proceeding data exchange, data updating, and data back-up. It resolves the problem of data synchrony in-between different OSs when systems process switching operations.

FIG. 1, which shows the main structure of the functional modules of the disclosed system and method, describes the structure of the data exchange/update/backup system 200 of the disclosed invention as follows.

(1) The first auto-update and real-time monitor module 210: it automatically starts up and operates when the first operating system 110 starts up. It is mainly responsible for updating a batch of data to the first personal information management system 111, as well as a real-time monitoring operation of modified data during the process.

(2) The second auto-update and real-time monitor module 220: it automatically starts up and operates when the second operating system 120 starts up. It is mainly responsible for updating a batch of data to the second personal information management system 121, as well as a real-time monitoring operation of modified data during the process.

The above-mentioned first auto-update and real-time monitor module 210 and second auto-update and real-time monitor module 220 have two kinds of execution patterns: one is a batch update pattern; the other is a real-time monitor update pattern. When the module starts operating, it firstly goes into the batch update pattern to begin data updating.

Once completed, it goes into the real-time monitor update pattern to process data exchange, updating and back-up.

(3) The system connecting and exchanging module 250: it is mainly responsible for connecting and communicating between the first personal information management system 111 and the second personal information management system 121. It mainly processes data format conversion, turning different formats of original data contents into standard formatted contents, i.e., XML (eXtensible Markup Language). This module makes it easier to convert data between different systems, and provides procedures of data compression and encryption to increase data storage capacity and security.

(4) The content comparison and algorithm unit 230, within the system connecting and exchanging module 250, provides a comparison process and condition set-up of updated and duplicated data contents to enable a user to choose a combination of provided items to process data exchange, date updating, and data back-up.

(5) The exchange configuration set-up unit 240, within the system connecting and exchanging module 250, provides a user with the configuration set-up s/he wants to execute. The configuration set-up a user wants to execute includes set-up of an OS object of execution, an object of an application program, application program items, data types, etc.

In addition, the system connecting and exchanging module 250 processes the operations of connection and data exchange between the first personal information management system 111 and the second personal information management system 121 respectively through the first auto-update and real-time monitor module 210 and the second auto-update and real-time monitor module 220.

(6) The backup data interim storage module 260 temporarily stores the latest modified data contents, which are synchronously updated and provided while the systems are switching and processing executions.

Figure 2:
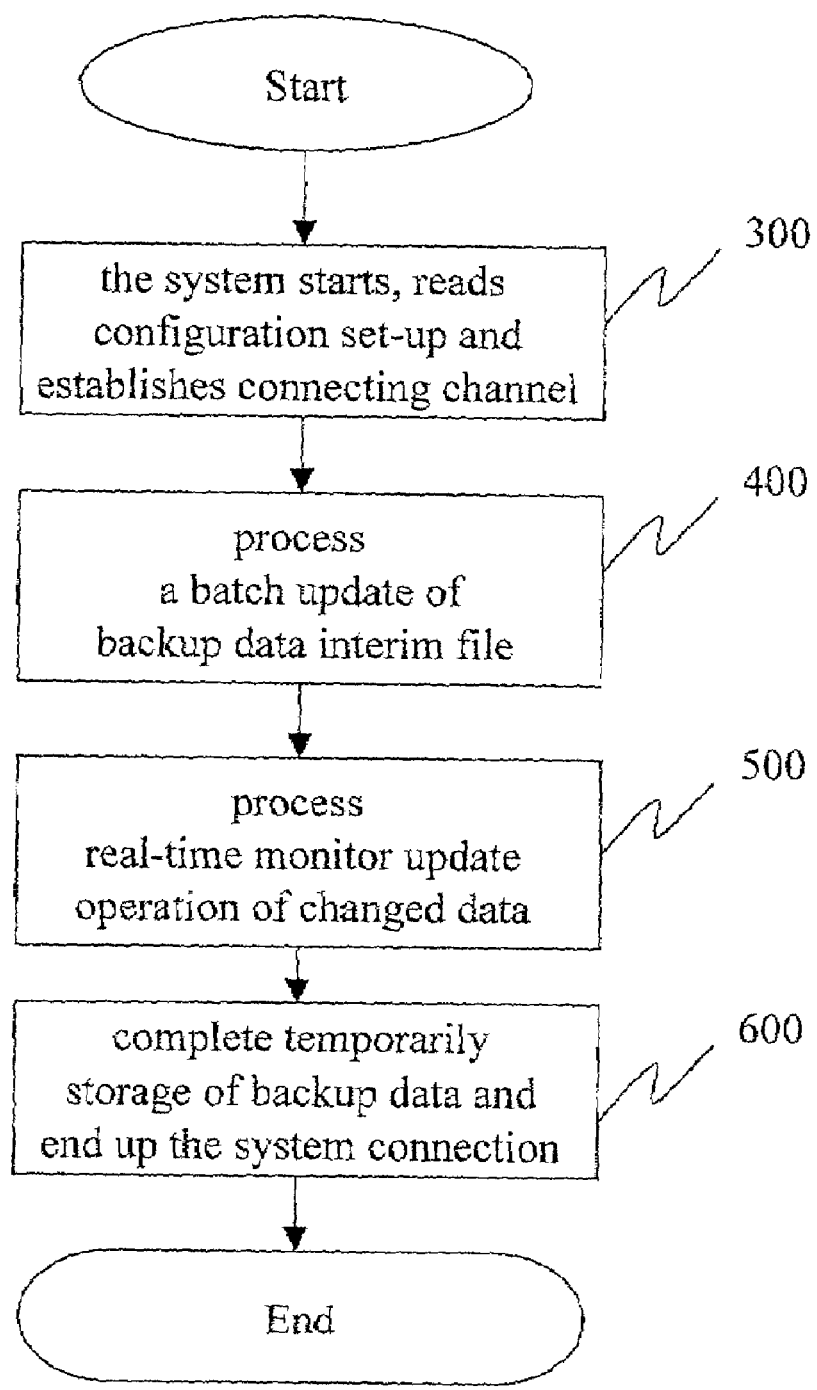
FIG. 2 shows a main operational flowchart of the disclosed system and method.

FIG. 2, the operational flowchart of the disclosed system and method, further describes the main flow of proceeding data exchange, data updating, and data back-up after the system is started.

First, the OSs (e.g. the first operating system 110 and the second operating system 120) are started up, and the data exchange/update/backup system 200 of the disclosed invention is then started up. The data exchange/update/backup system 200 reads configuration set-up, and establishes the connection between personal information management systems (e.g. the first personal information management system 111 and the second personal information management system 121) (Step 300). After the connection is completed, it enters into the batch update pattern to begin the first batch operation of updating temporarily stored backup data (Step 400). It mainly processes prior data exchange, data updating, and data back-up for backup data contents being previously stored in an interim backup data file and data being connected between the personal information management systems. When the operation is completed, the data exchange/update/backup system 200 automatically enters the real-time monitor update pattern to process instant data exchange, data updating, and data back-up when there is any changed data during the operation between the personal information management systems (step 500). When the OSs is shut down, the data exchange/update/backup system 200 automatically proceeds with the operations of temporarily storing the last and necessary backup data, automatically finishes the connection with the personal information management systems and completes data exchange, data updating, and data back-up. Finally, it ends the main flow (step 600).

Figure 3:
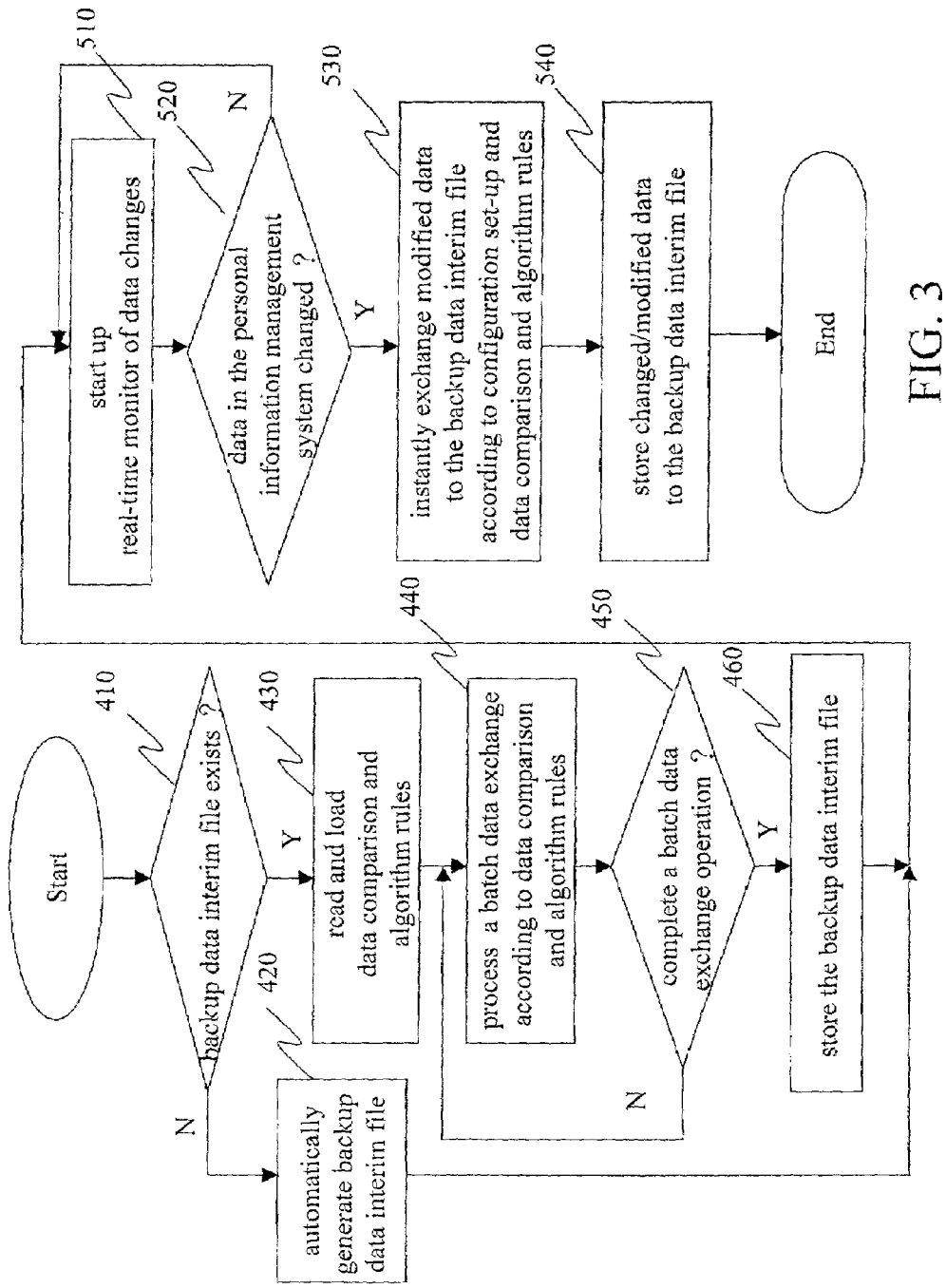
FIG. 3 shows a flowchart representation of the data batch operation and instant data exchange for updating and back-up of the disclosed system and method.

The process flow of batch and instant data exchange, data updating, and data back-up, is further described by FIG. 3, the flowchart representation of the data batch operation and instant data exchange for update and back-up of the disclosed system and method. The details are as follows.

First, when the data exchange/update/backup system 200 enters the batch update pattern, it starts to determine whether there is an interim backup data file (step 410). If not, the system automatically generates a proper storage file for temporarily saving backup data (step 420). If yes, the system automatically reads data and load data comparison and algorithm rules (step 430) to process data comparison. It then processes the first batch of data update operations in the personal information management systems and in the interim backup data file according to pre-set configuration and data comparison and algorithm rules (step 440). In the mean time, the system determines whether the batch of exchange operation is completed (step 450). If not, the system continues the batch of exchange operation (step 440). If yes, the system automatically stores data contents into the interim backup data file (step 460). The system then automatically enters a real-time monitor update pattern to start up instant monitoring of changed data (step 510). The system constantly monitors whether there is any modified data in the personal information management system that is connected to the system (step 520). If not, the system continues monitoring changes, or, if there are any changes (step 520), the system instantly exchanges related data in the interim backup data file according to configuration set-up and contents of data comparison and algorithm rules (step 530). When there is any data being modified or changed, the system automatically stores exchanged and modified data (step 540), until the system ends. The data exchange/update/backup system 200 then automatically ends instant monitoring update operations.

Figure 4:
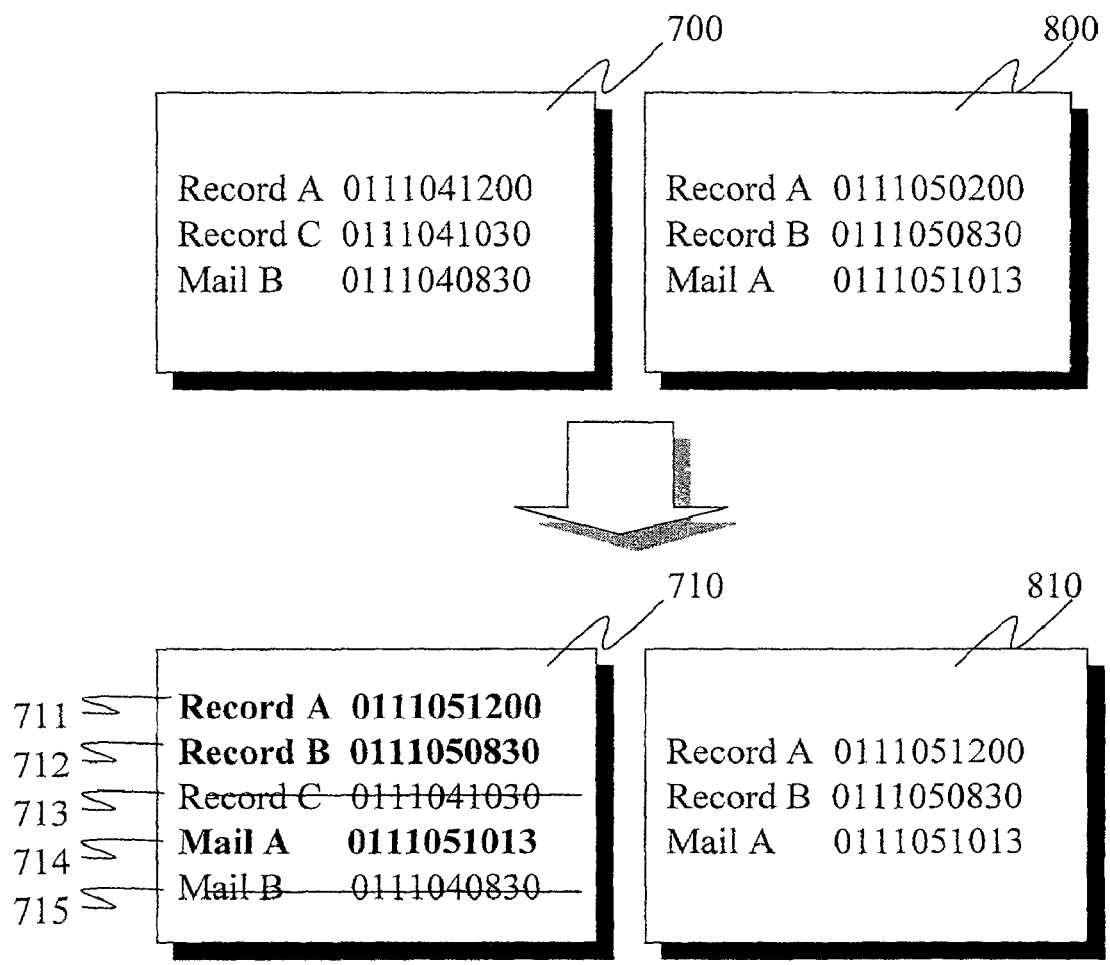
FIG. 4 shows an illustrated representation of the data batch processing of the disclosed system and method.

The feasibility and practicality of the invention will be elaborated by means of an embodiment depicted in the following. FIG. 4, the illustrated representation of the data batch process of the disclosed system and method is further described as follows.

The batch update pattern is mainly to update interim backup data into the personal information management systems before the first connection. Therefore, the system processes comparison of data contents in the interim backup data file according to data comparison and algorithm rules (set to be data time for comparison in this embodiment) and configuration set-up (set to be records and mails as item types in this embodiment). Taking record A711 after the batch update operation as an example, record A simultaneously stores the content 700 of the un-updated personal information management system and the content 800 of the un-updated interim backup data file to be updated. The system replaces the earlier data contents (0111041200) with the latest data contents (0111051200). If there is any data content that did not exist in the content 700 of the un-updated personal information management system and in the content 800 of the un-updated interim backup data file, the system adds data that is not included in the content 700 of the un-updated personal information management system (e.g. record B712 and mail A714 after the batch update operation) into the content 800 of the un-updated interim backup data file. Moreover, the system removes excess data (e.g. record C713 and mail B715 after the batch update operation) to maintain data synchrony after the batch update operation in both the content 710 of the updated personal information management system and the content 810 of the the updated interim backup data file.

Figure 5:
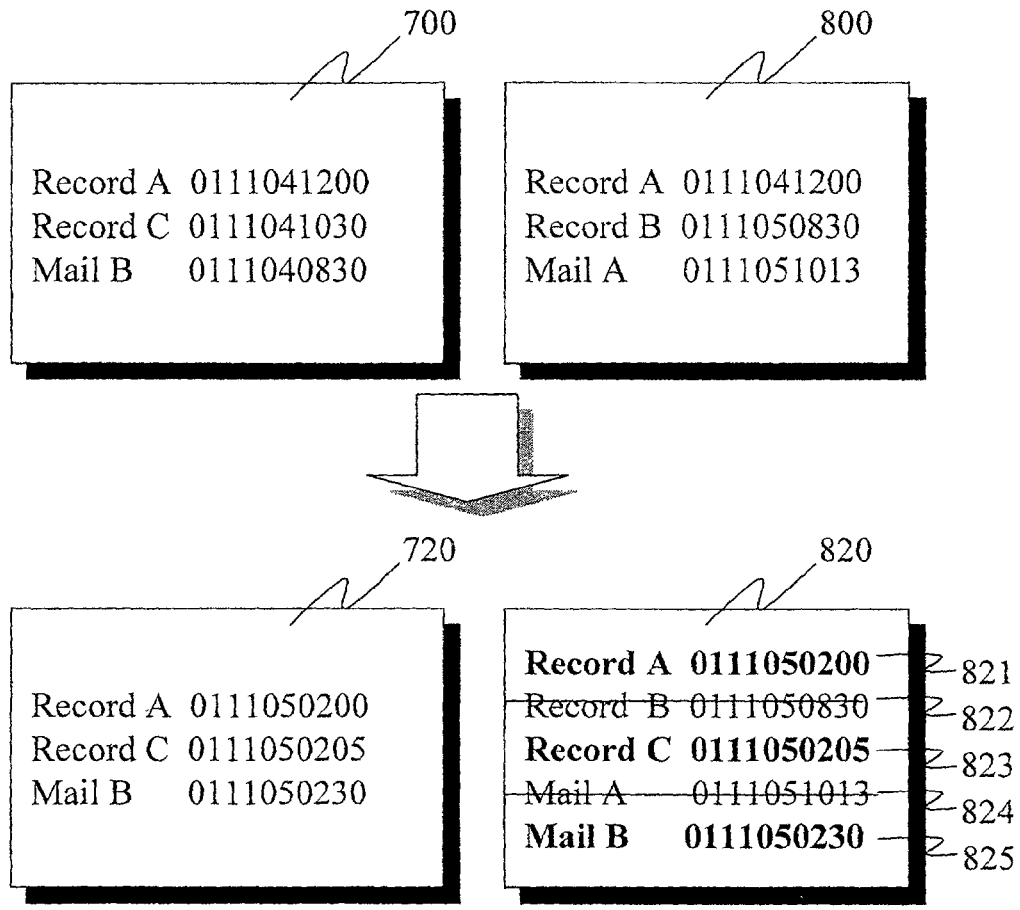
FIG. 5 shows an illustrated representation of the real-time monitoring process of the disclosed system and method.

When the batch update operation is completed, the system automatically enters the instant monitoring pattern. FIG. 5 is an illustrated representation of the real-time monitor process of the disclosed system and method. The details are described as follows.

The system processes the same comparison of data contents in the personal information management system according to data comparison and algorithm rules (set to be data time for comparison in this embodiment) and configuration set-up (set to be records and mails as item types in this embodiment). Taking record A821 after the real-time monitor update operation as an example, record A simultaneously stores the content 700 of the un-updated personal information management system and the content 800 of the un-updated interim backup data file to be updated. The system replaces the earlier data contents (0111041200) with the latest data contents (0111051200). If there is any data content that did not exist in the content 700 of the un-updated personal information management system and in the content 800 of the un-updated interim backup data file, the system adds data that is not included in the content 800 of the un-updated personal information management system (e.g. record C823 and mail B825 after the real-time monitor update operation) into the content 720 of the real-time monitor updated interim backup data file. Moreover, the system removes excess data (e.g. record B822 and mail A824 after the real-time monitor update operation) to maintain data synchrony after the real-time monitor update operation in both the content 720 of the updated personal information management system and in the content 820 of the updated interim backup data file.

ACHIEVEMENTS OF THE INVENTION

The disclosed updating and back-up system and method of exchanging data in two co-existing OSs (operating system) of a computer is capable of processing automatic data exchange, data updating and data back-up between different personal information management systems of one computer platform, without a user's involvement or by any medium of auxiliary storage.

The invention not only reduces time required for importing and exporting data, but also saves money on purchasing storage media. It further simplifies the procedure for synchronizing data through a compatible data exchange method, and does not cause a user any unnecessary trouble with data formats during data exchange operations. The invention thus greatly heightens efficiency of data in-between different systems to increase the utility of data.

In addition, the disclosed system enables a user to customize data comparison methods and compare items, considering the various requirements of users.

As previously stated, detailed embodiments of the invention are disclosed herein. However, it is to be understood that the disclosed embodiments are merely exemplary of the invention that may be embodied in various forms. These and other variations, which will be understood by those skilled in the art, are within the intended scope of the invention as claimed below.

What is claimed is:

1. An update and back-up system of exchanging data in two co-existing operating system (OSs) of a computer to make connections in-between different OSs to access and exchange data within a personal information management system to achieve the objects of data update and data back-up, the system comprising:
    a first auto-update and real-time monitor module, is to proceed real-time monitor of data update and data change in a first personal information management system;
    a second auto-update and real-time monitor module to proceed real-time monitor of data update and data change in a second personal information management system;
    a backup data interim storage module to temporarily store the latest modification of data content; and
    a system connecting and exchange module to connect the first personal information management system or the second personal information management system, and convert data formats further comprising:
        a content comparison and algorithm unit to provide a condition set-up of data comparison for data update and data backup; and
        an exchange configuration set-up unit to enable a user to set up an execution configuration;
    wherein the system connecting and exchange module proceeds not only system connections and data transmission of the first personal information management system through the first auto-update and real-time monitor module, but also system connections and data transmission of the second personal information management system through the second auto-update and real-time monitor module.

2. The system of claim 1, wherein the update and back-up system can be executed in a computer execution platform.

3. The system of claim 2, wherein the computer execution platform can be selected from the group combinations consisting of: a PC (Personal Computer), a NB (Notebook or laptop), and a mobile phone or a PDA (Personal Digital Assistant).

4. The system of claim 1, wherein the first auto-update and real-time monitor module and the second auto-update and real-time monitor module are executed through starting up the operating system of a computer.

5. The system of claim 1, wherein the first auto-update and real-time monitor module and the second auto-update and real-time monitor module both contain batch update pattern and real-time monitor update pattern.

6. The system of claim 1, wherein the backup data interim storage module stores data that is compressed and encrypted by utilizing XML (eXtensible Markup Language) format.

7. The system of claim 1, wherein the condition set-up of data comparison can be selected from some of the group combinations consisting of: data time, data contents, and data size.

8. The system of claim 1, wherein the exchange configuration set-up unit contains set-ups of wanted executions, including an object of the operating system, an object of application program, application program items, and/or data types.

* * * * *